United States Patent
Xia et al.

(10) Patent No.: US 10,942,287 B2
(45) Date of Patent: Mar. 9, 2021

(54) SEMBLANCE-BASED ANISOTROPY PARAMETER ESTIMATION USING ISOTROPIC DEPTH-MIGRATED COMMON IMAGE GATHERS

(71) Applicant: Landmark Graphics Corporation, Houston, TX (US)

(72) Inventors: Fan Xia, Katy, TX (US); Shengwen Jin, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 302 days.

(21) Appl. No.: 15/777,089

(22) PCT Filed: Jan. 15, 2016

(86) PCT No.: PCT/US2016/013563
§ 371 (c)(1),
(2) Date: May 17, 2018

(87) PCT Pub. No.: WO2017/123240
PCT Pub. Date: Jul. 20, 2017

(65) Prior Publication Data
US 2018/0335533 A1   Nov. 22, 2018

(51) Int. Cl.
*G01V 1/50*   (2006.01)
*G01V 1/30*   (2006.01)
(Continued)

(52) U.S. Cl.
CPC ............. *G01V 1/306* (2013.01); *G01V 1/362* (2013.01); *G01V 1/40* (2013.01); *G01V 1/50* (2013.01);
(Continued)

(58) Field of Classification Search
CPC . G01V 1/40; G01V 1/50; G01V 1/306; G01V 1/362; G01V 2210/626; G01V 2210/512; G01V 2210/6222
See application file for complete search history.

(56) References Cited

U.S. PATENT DOCUMENTS 5,982,706 A    11/1999  Byun
6,785,612 B1 *  8/2004  Zhang .................... G01V 1/303
                                                702/14
(Continued)

OTHER PUBLICATIONS

International Search Report and the Written Opinion of the International Search Authority, or the Declaration, dated Oct. 13, 2016, PCT/US2016/013563, 10 pages, ISA/KR.
(Continued)

*Primary Examiner* — Stephanie E Bloss
(74) *Attorney, Agent, or Firm* — Haynes and Boone, LLP

(57) ABSTRACT

Methods and systems are presented in this disclosure for semblance-based anisotropy parameter estimation using isotropic depth-migrated common image gathers. Far-offset image gathers can be generated from seismic data associated with a subterranean formation migrated based on an isotropic depth migration that uses an isotropic velocity model. Based on the far-offset image gathers, a plurality of semblance values can be calculated as a function of an anisotropy parameter of the subterranean formation for the different depths and the surface locations. Effective values of the anisotropy parameter of the subterranean formation can be then chosen that result in maxima of the plurality of semblance values for the different depths and the surface locations. Anisotropy model of the subterranean formation can be obtained based on the effective values of the anisotropy parameter.

20 Claims, 10 Drawing Sheets

(51) Int. Cl.
*G01V 1/40* (2006.01)
*G01V 1/36* (2006.01)

(52) U.S. Cl.
CPC .... *G01V 2210/512* (2013.01); *G01V 2210/52* (2013.01); *G01V 2210/626* (2013.01); *G01V 2210/6222* (2013.01); *G01V 2210/6242* (2013.01)

(56) References Cited

U.S. PATENT DOCUMENTS

| | | | |
|---|---|---|---|
| 6,826,484 | B2 | 11/2004 | Martinez et al. |
| 2003/0151976 | A1* | 8/2003 | Leaney .................. G01V 1/42 367/38 |
| 2004/0041815 | A1 | 3/2004 | Meek et al. |
| 2004/0093163 | A1 | 5/2004 | Reshef et al. |
| 2005/0088914 | A1* | 4/2005 | Ren ........................ G01V 1/284 367/52 |
| 2009/0213692 | A1* | 8/2009 | Martinez ................ G01V 1/303 367/52 |
| 2010/0110832 | A1 | 5/2010 | Valenciano et al. |
| 2010/0133010 | A1* | 6/2010 | Blias ...................... G01V 1/42 175/50 |
| 2010/0326669 | A1 | 12/2010 | Zhu et al. |
| 2015/0293245 | A1 | 10/2015 | Mesdag et al. |
| 2016/0320505 | A1* | 11/2016 | D'Afonseca ........... G01V 1/303 |
| 2017/0115422 | A1* | 4/2017 | Kitazawa ............... G01V 1/303 |
| 2017/0176617 | A1* | 6/2017 | Colombo ............... G01V 1/364 |

OTHER PUBLICATIONS

Alkhalifah, T., 1997, Velocity analysis using nonhyperbolic moveout in transversely isotropic media: Geophysics, 62, 1839-1854.

Bakulin, A., M. Woodward, D. Nichols, K. Osypov, and O. Zdraveva, 2010a, Building tilted transversely isotropic depth models using localized anisotropic tomography with well information: Geophysics, 75, No. 4, D27-D36.

Bakulin, A., M. Woodward, D. Nichols, K. Osypov, and O. Zdraveva, 2010b, Localized anisotropic tomography with well information in VTI media: Geophysics, 75, No. 5, D37-D45.

Behera, L., and I. Tsvankin, 2009, Migration velocity analysis for tilted transversely isotropic media: Geophysical Prospecting, 57, 13-26.

Douma, H., and M. van der Baan, 2008, Rational interpolation of qP-traveltimes for semblance-based anisotropy estimation in layered VTI media: Geophysics, 73, No. 4, D53-D62.

Harlan, W., 1998, A convenient approximation of transverse isotropy for higher-order moveout, prestack time migration, and depth calibration: http: www.billharlan.com/papers/aniso.pdf.

Harlan, W., 1999, Constrained Dix inversion: http: www.billharlan.com/papers/rmsinv.pdf.

Huang, T., S. Xu, and Y. Zhang, 2007, Anisotropy estimation for prestack depth migration—A tomographic approach: 77th Annual International Meeting, SEG, Expanded Abstracts, 124-128.

Huang, T., S. Xu, J. Wang, and M. Richardson, 2008, The benefit of TTI tomography for dual azimuth data in Gulf of Mexico: 78th Annual International Meeting, SEG, Expanded Abstracts, 222-226.

Isaac, J., and D. Lawton, 2004, A practical method for estimating effective parameters of anisotropy from reflection seismic data: Geophysics, 69, 681-689.

Jones, I., 2003, A review of 3D PreSDM model building techniques: First Break, 21, 41-54.

Koren, Z., I. Ravve, G. Gonzalez, and D. Kosloff, 2008, Anisotropic local tomography: Geophysics, 73, No. 5, VE75-VE92.

Neidell, N., and M. Taner, 1971, Semblance and other coherency measures for multichannel data: Geophysics, 36, 482-497.

Reshef, M., and M. Roth, 2006, VTI anisotropic corrections and effective parameter estimation after isotropic prestack depth migration: Geophysics, 71, No. 3, D35-D43.

Rüger, A., 2001, Reflection coefficients and azimuthal AVO analysis in anisotropic media: Geophysical monograph series, 10, SEG.

Toldi, J., 1989, Velocity analysis without picking: Geophysics, 54, 191-199.

Tsvankin, I., and L. Thomsen, 1994, Nonhyperbolic reflection moveout in anisotropic media: Geophysics, 59, 1290-1304.

Tsvankin, I., 1996, P-wave signatures and notation for transversely isotropic media: An overview: Geophysics, 61, 467-483.

Tsvankin, I., 2005, Seismic signatures and analysis of reflection data in anisotropic media: Elsevier Ltd.

Tsvankin, I., J. Gaiser, V. Grechka, M. van der Baan, and L. Thomsen, 2010, Seismic anisotropy in exploration and reservoir characterization: An overview: Geophysics, 75, No. 5, 75A15-75A29.

Wang, X., and I. Tsvankin, 2010, Stacking-velocity inversion with borehole constraints for tilted TI media: Geophysics, 75, No. 5, D69-D77.

Woodward, M. J., D. Nichols, O. Zdraveva, P. Whitfield, and T. Johns, 2008, A decade of tomography: Geophysics, 73, No. 5, VE5-VE11.

Xia, F., S. Jin, and J. Pajchel, 2015, Sensitivity kernel-based tomographic migration velocity analysis using RTM angle image gathers, Geophysics, 80, No. 3, U25-U34.

Xiao, C., J. Bancroft, and R. Brown, 2005, Estimation of Thomsen's anisotropy parameters by moveout velocity analysis: 75th Annual International Meeting, SEG, Expanded Abstracts, 194-197.

Zhou, C., J. Jiao, S. Lin, J. Sherwood, and S. Brandsberg-Dahl, 2011, Multiparameter joint tomography for TTI model building: Geophysics, 76, No. 5, WB183-WB190.

Zhou, H., D. Pham, S. Gray, and B. Wang, 2004, Tomographic velocity analysis in strongly anisotropic TTI media: 74th Annual International Meeting, SEG, Expanded Abstracts, 2347-2350.

Epili et al., "Improved Subsalt Imaging Using TTI Anisotropy and Reverse Time Migration Scans," Conference Paper, SEG Annual Meeting, Jan. 2011, San Antonio, Texas, USA.

* cited by examiner

| | Depth (m) | $v_0$ (m/s) | $\eta_T$ | $\delta_T$ | $\varepsilon_T$ |
|---|---|---|---|---|---|
| Layer 1 | 2500.0 | 3000.0 | 0.076 | 0.09 | 0.18 |
| Layer 2 | 5000.0 | 3250.0 | 0.090 | 0.11 | 0.22 |
| Layer 3 | | 3500.0 | 0.103 | 0.13 | 0.26 |

800

| | Depth after calibration (m) | $\eta$ | $\delta_T$ | $\varepsilon$ |
|---|---|---|---|---|
| Layer 1 | 2513.1 | 0.078 | 0.09 | 0.182 |
| Layer 2 | 5006.6 | 0.095 | 0.11 | 0.226 |
| Layer 3 | | - | - | - |

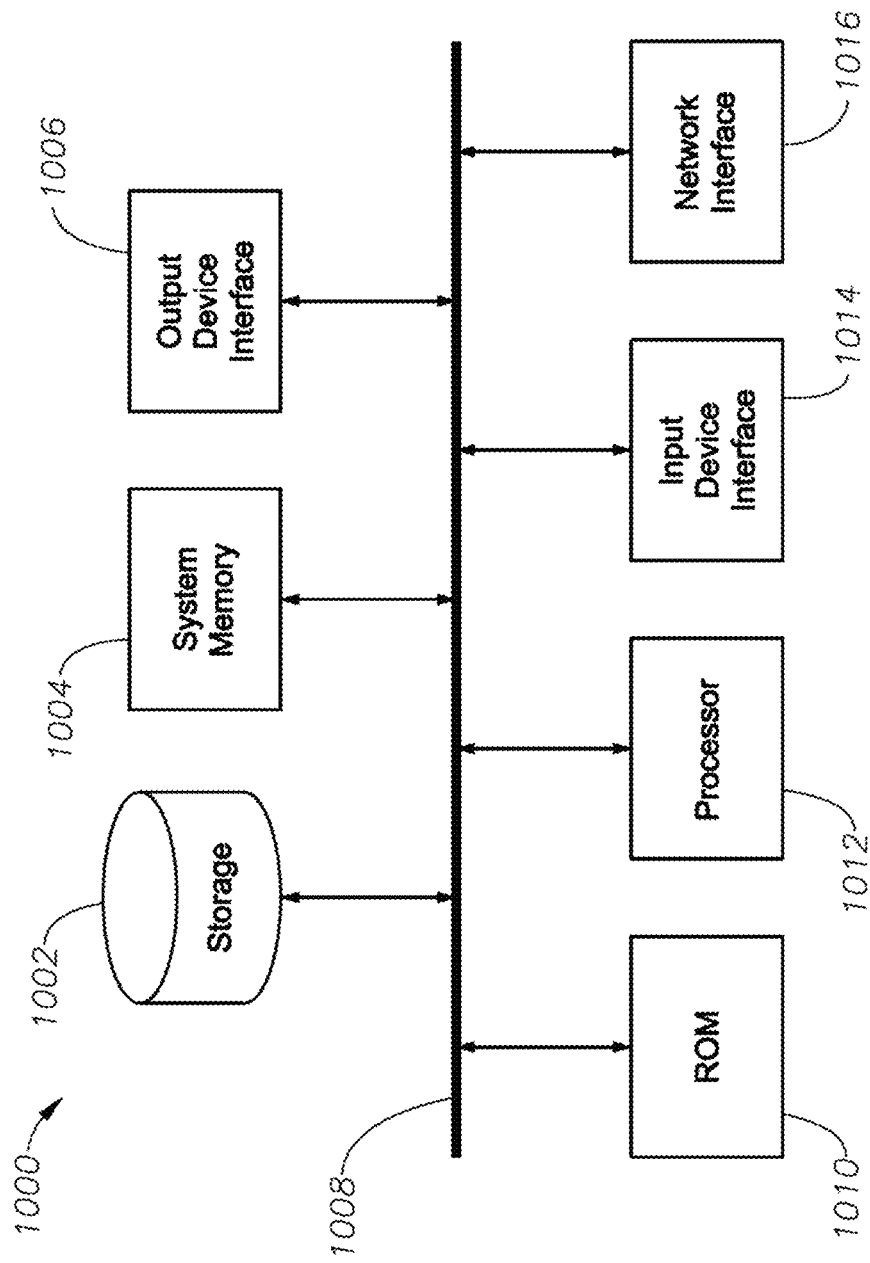

SEMBLANCE-BASED ANISOTROPY PARAMETER ESTIMATION USING ISOTROPIC DEPTH-MIGRATED COMMON IMAGE GATHERS

PRIORITY

The present application is a U.S. National Stage patent application of International Patent Application No. PCT/US2016/013563, filed on Jan. 15, 2016, the benefit of which is claimed and the disclosure of which is incorporated herein by reference in its entirety.

TECHNICAL FIELD

The present disclosure generally relates to anisotropy parameter estimation and, more particularly, to semblance-based anisotropy parameter estimation using isotropic depth-migrated common image gathers.

BACKGROUND

Certain earth formations exhibit a property called "anisotropy", where the velocity of acoustic waves polarized in one direction may be somewhat different than the velocity of acoustic waves polarized in a different direction within the same earth formation. Anisotropy may arise from intrinsic structural properties, such as grain alignment, crystallization, aligned fractures, or from unequal stresses within the formation. Anisotropy is particularly of interest in the measurement of the velocity of seismic P-waves propagating in the earth formations. Subsurface formations are often anisotropic, meaning that the acoustic waves propagation speed depends on the direction in which the wave propagates. Typically, the formations, even when anisotropic, are relatively isotropic in the horizontal plane. This particular version of anisotropy is often called vertical transverse isotropy (VTI). Accurate seismic imaging requires that such anisotropy be accounted for during the migration portion of seismic data processing.

Conventional seismic data processing that does not account for the presence of anisotropy typically results in low quality subsurface images and inaccurate positioning of reflectors that do not tie to hydrocarbon wells. Over the past several decades, seismic processing has gradually developed to allow for estimation of anisotropy parameters from seismic data. VTI based model represents a conventional model for anisotropic depth imaging in many areas, and prior knowledge of a vertical velocity and two anisotropy Thomsen parameters $\epsilon$ and $\delta$ is essential to produce accurate depth image of P-wave seismic data.

In general, estimation of anisotropy parameters usually requires several iterations of pre-stack depth migration (PSDM), special treatment of near- and far-offset data in time and depth domains, and use of non-seismic information. However, estimation of reliable anisotropy parameters in the depth domain remains a challenging problem. Typically, building a VTI model in the depth domain requires a prior constraint because resolving all parameters of the model from P-wave data alone is known to be a highly non-unique process, even for layered geological environments. In some cases, the vertical velocity can be obtained from check shots or well logs at borehole locations, and many approaches for estimating the Thomsen anisotropy parameters have been developed under the assumption of knowledge of vertical velocity available in advance.

Tomographic migration velocity analysis (TMVA) utilizes the redundancy in the depth-migrated common image gathers (CIG) to refine a velocity model based on iterative minimization of residual move-out (RMO) after PSDM. TMVA based method has been proposed for anisotropy estimation in the areas where vertical velocity can be accurately obtained at well locations. The stacking velocity tomography can be used to recover anisotropy parameters in layered media provided that similar well data are supplemented. TMVA based approach has been developed to update factorized VTI model of blocky media, considering that the vertical velocity is a linear function of spatial coordinates and that anisotropy is constant within a block. TMVA can be also employed to invert seismic and well data jointly for multiple parameters of a local VTI depth model. Only with the aid of borehole information, anisotropic TMVA allows building a heterogeneous VTI model for depth imaging that resolves the existing ambiguities.

In the absence of a priori constraints such as well data (e.g., information related to a wellbore penetrating formation layers), the anisotropic TMVA updates only the vertical velocity field, while it is a conventional practice to obtain initial estimates of the Thomsen parameters in advance without tomography. From a practical standpoint, it is desirable to build an initial global field of anisotropy parameters using P-wave seismic data. TMVA for isotropic media has become the conventional velocity model building tool for seismic depth imaging. However, it is well known that due to the lack of Thomsen anisotropy parameters $\epsilon$ and $\delta$, anisotropic data migrated with a velocity updated from the isotropic TMVA result in incoherent depth images.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 8 illustrates tables showing anisotropy parameters for a true horizontally layered model and estimated values of anisotropy parameters obtained based on the presented semblance-based estimation method, according to certain embodiments of the present disclosure.

FIG. 10 is a block diagram of an illustrative computer system in which embodiments of the present disclosure may be implemented.

DETAILED DESCRIPTION

Figure 1:
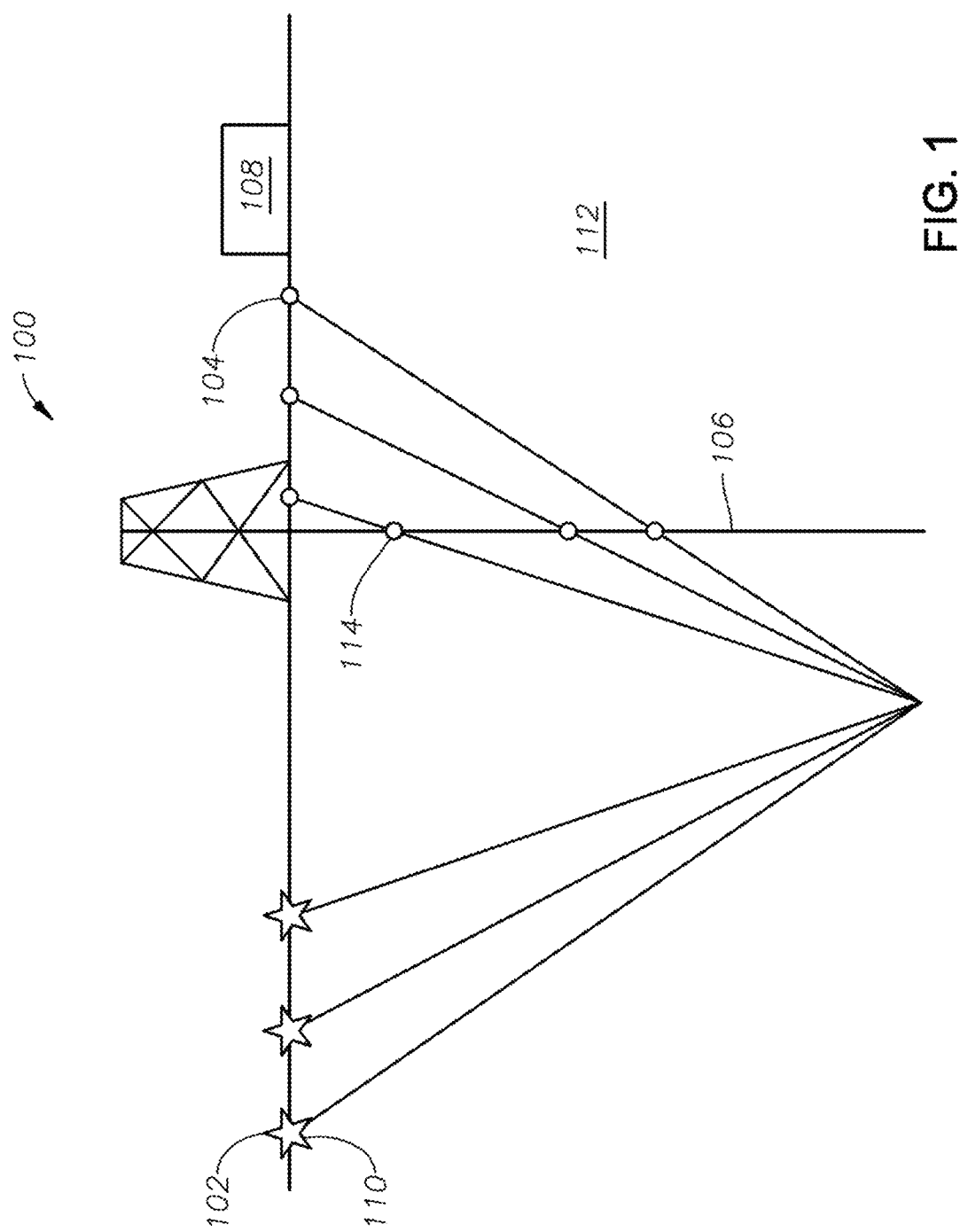
FIG. 1 is a schematic diagram showing a cross-sectional view of an illustrative environment with seismic sources, seismic receivers, a wellbore and a computing system, according to certain embodiments of the present disclosure.

Embodiments of the present disclosure relate to a method for semblance-based anisotropy parameter estimation using isotropic depth-migrated common image gathers. The estimation method presented herein is motivated based on observation that incoherent depth images due to anisotropic data migrated with a velocity updated from isotropic tomographic migration velocity analysis (TMVA) carry important information that can be used to estimate initial anisotropy parameters (e.g., initial anellipticity parameter η) from P-wave seismic data. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one ordinarily skilled in the art to implement such feature, structure, or characteristic in connection with other embodiments whether or not explicitly described. It would also be apparent to one ordinarily skilled in the relevant art that the embodiments, as described herein, can be implemented in many different embodiments of software, hardware, firmware, and/or the entities illustrated in the Figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding Figure and the downward direction being toward the bottom of the corresponding Figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those ordinarily skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those ordinarily skilled in the art that the apparatus according to the present disclosure is equally well suited for use in onshore operations and vice-versa. Further, unless otherwise noted, even though a Figure may depict a cased hole, it should be understood by those ordinarily skilled in the art that the apparatus according to the present disclosure is equally well suited for use in open hole operations.

Illustrative embodiments and related methods of the present disclosure are described below in reference to FIGS. 1-10 as they might be employed for semblance-based anisotropy parameter estimation using isotropic depth-migrated common image gathers. Such embodiments and related methods may be practiced, for example, using a computer system as described herein. Other features and advantages of the disclosed embodiments will be or will become apparent to one of ordinary skill in the art upon examination of the following Figures and detailed description. It is intended that all such additional features and advantages be included within the scope of the disclosed embodiments. Further, the illustrated Figures are only exemplary and are not intended to assert or imply any limitation with regard to the environment, architecture, design, or process in which different embodiments may be implemented.

As the conventional isotropic data processing methods introduce errors for anisotropic seismic data, robust techniques for the estimation of anisotropy parameters based on the error analysis are becoming more important. An estimation method presented in this disclosure demonstrates that it is possible to obtain estimates of anisotropy parameters (e.g., anellipticity parameter η) in the depth domain deterministically only from the P-wave seismic data by using anisotropic data migrated with an isotropic velocity inverted from the isotropic migration velocity analysis (MVA).

In accordance with embodiments of the present disclosure, a semblance-based method for estimating the anellipticity parameter η in the depth domain is developed by analyzing residual move-out (RMO) on isotropic depth-migrated common image gathers (CIG) after application of the isotropic MVA. The presented method for estimating the anellipticity parameter η is designed for building the initial anellipticity model for the anisotropic pre-stack depth migration (PSDM) and anisotropic TMVA. In one or more embodiments, the first anisotropy Thomsen parameter E can be converted analytically from the estimated anellipticity parameter η provided that the second anisotropy Thomsen parameter δ was predicted from depth calibration (e.g., depth mis-tie calibration).

In one or more embodiments of the present disclosure, analytical RMO function is derived for measuring depth residuals on isotropic depth-migrated CIG without weak anisotropy assumption. The semblance analysis can be then applied to the RMO in order to directly search for effective values of the anellipticity parameter η. The obtained effective values of the anellipticity parameter can be then efficiently converted into an intrinsic anisotropy model in depth domain. It should be noted that the workflow of the present disclosure for building the anisotropy model in depth domain maintains the simplicity of the traditional normal move-out (NMO) velocity analysis. Based on the obtained intrinsic anisotropy model in depth domain, the anisotropic PSDM and anisotropic TMVA may be performed resulting into coherent depth images of subterranean formations. Certain illustrative embodiments of the present disclosure demonstrate the capability of the presented method for anisotropy parameter estimation.

The depth variation of primary reflection events between migrated images of different offsets is known as RMO, which provides the primary source of information for anisotropy parameter estimation. Typically, RMO is analyzed on the offset image gathers, one of the depth-migrated CIG, which can be generated by, for example, Kirchhoff PSDM. For most anisotropic P-wave data, except for elliptical anisotropy case, isotropic TMVA updates the velocity model that only optimizes the near-offset data and flattens the near-offset CIG. The nonzero RMO observed on far-offsets of CIG is typically due to lack of estimation of anisotropy parameters. The objective of the estimation method presented in this disclosure is to utilize far-offset RMO for anisotropy parameter estimation in order to reduce residual errors in the offset image gathers.

FIG. 1 is a schematic diagram showing a cross-sectional view of an illustrative environment 100 with seismic sources 102, seismic receivers 104, a wellbore 106 and a computing system 108, according to certain illustrative embodiments of the present disclosure. The energy (e.g., acoustic wave) 110 from one or more seismic sources 102 at or near the surface travels through the subterranean formation 112, reflects off of various subterranean formations or geological features, and is subsequently collected as seismic data at the surface using the surface receivers 104 or within the wellbore 106 using wellbore receivers 114. For certain embodiments of the present disclosure, the subterranean formation 112 can be anisotropic, i.e., propagation speed of acoustic waves may depend on the direction in which the acoustic wave propagates.

In accordance with embodiments of the present disclosure, the computing system 108 may be configured to acquire seismic data associated with the subterranean formation 112 from the surface receivers 104 and/or the wellbore receivers 114, and perform estimation of anisotropy parameters of the subterranean formation 112 as disclosed in the present disclosure and discussed in further detail below. In one or more embodiments, the computing system 108 may be further configured to utilize the estimated anisotropy parameters of the subterranean formation 112 and perform anisotropic PSDM and anisotropic TMVA providing coherent depth images and an accurate seismic data volume associated with the subterranean formation 112. For some embodiments, the obtained coherent depth images and the accurate seismic data volume of the subterranean formation 112 obtained by taking into account anisotropy parameters of the subterranean formation 112 may be utilized in real time for drilling of the wellbore 106. In general, the presented method for estimation of anisotropy parameters of subterranean formations may be applied for obtaining more coherent depth images of hydrocarbon reservoirs in the subterranean formations leading to more efficient drilling of wellbores and increased hydrocarbon production.

In one or more embodiments of the present disclosure, the anellipticity parameter η, whose departure from zero indicates anisotropy, can be defined by the first and second Thomsen parameters ε and δ, i.e., $$\eta = \frac{\varepsilon - \delta}{1 + 2\delta}. \tag{1}$$

For certain embodiments, a preferred isotropic velocity can be defined as the velocity updated from isotropic TMVA that removes RMO on the near-offset P-wave data. The relationship between a preferred isotropic velocity and anisotropic NMO velocity can be derived for flat reflections (i.e., reflections with removed RMO on near offsets). The anellipticity parameter η relates to the preferred isotropic velocity by means of the anisotropic NMO velocity.

Additionally, it can be demonstrated, by examining results of reflection-traveltime inversions by semblance analysis, that the non-hyperbolic approximation can be used to accurately estimate anisotropic parameters.

Under the assumption that the NMO velocity can be approximated by the preferred isotropic velocity inverted from the isotropic TMVA, and based on the non-hyperbolic approximation, an analytical RMO function can be derived for measuring depth residuals of the offset image gathers generated by the isotropic Kirchhoff PSDM by applying the preferred isotropic velocity to the long-offset data, i.e., $$z(\eta, x) = \sqrt{z_0^2 - \frac{\eta x^4}{8z_0^2 + 2(1 + 2\eta)x^2}}, \tag{2}$$

where z is a depth of a migrated image point in an offset image gather; $z_0$ is a depth of the migrated image point at zero offset; η is the anellipticity parameter in the constant (equivalent) media, and x is the offset between a seismic source and a seismic receiver.

Figure 2:
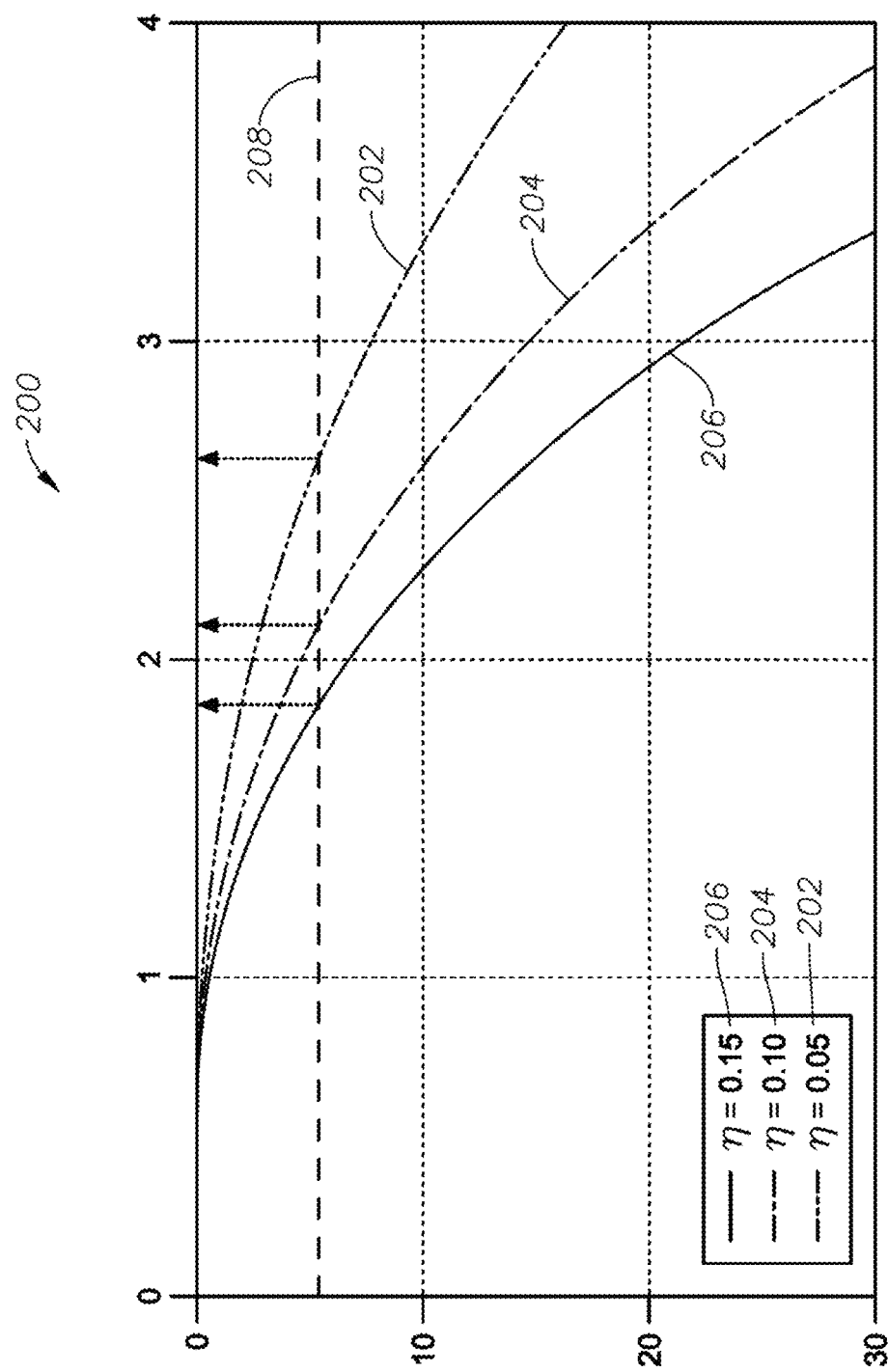
FIG. 2 is a graph illustrating residual move-out (RMO) functions with different values of an anellipticity parameter $\eta$ for a single horizontal Vertical Transverse Isotropy (VTI) layer, according to certain embodiments of the present disclosure.

FIG. 2 illustrates a graph 200 showing RMO functions for different values of the anellipticity parameter η for a single horizontal vertical transverse isotropy (VTI) layer, according to certain illustrative embodiments of the present disclosure. The RMO functions 202, 204 and 206 are derived using equation (2) for the values of anellipticity parameter η of 0.05, 0.10 and 0.15, respectively. The horizontal axis in the graph 200 represents an offset-to-depth ratio α, and the vertical axis in the graph 200 represents RMO percentage defined as the change of reflector depth divided by the zero-offset depth. It should be noted that the RMO function varies quickly with increasing of the offset-to-depth ratio α and anellipticity parameter η. Considering that an adequate RMO percentage in the data can be used to resolve the anellipticity parameter η (e.g., RMO percentage of 5%), the corresponding offset-to-depth ratios (i.e., points on the horizontal axis at which the line 208 related to the RMO percentage of 5% intersects the RMO functions 202, 204, 206) reveal that the anellipticity parameter η should be estimated over the long offset data (e.g., data with the offset-to-depth ratio greater than one). In addition, it can be observed from FIG. 2 by comparing the RMO functions 202, 204 and 206 that estimation of a smaller anellipticity parameter η may require longer offset information (i.e., greater offset-to-depth ratio). Trivial RMO can be also observed in the graph 200 on the near offset, e.g., an offset that is less than or equal to a reflector depth (i.e., offset-to-depth ratio less than one). In one or more embodiments, criterion can be established to set a maximum offset of seismic data for obtaining the preferred isotropic velocity from isotropic TMVA.

Figure 3:
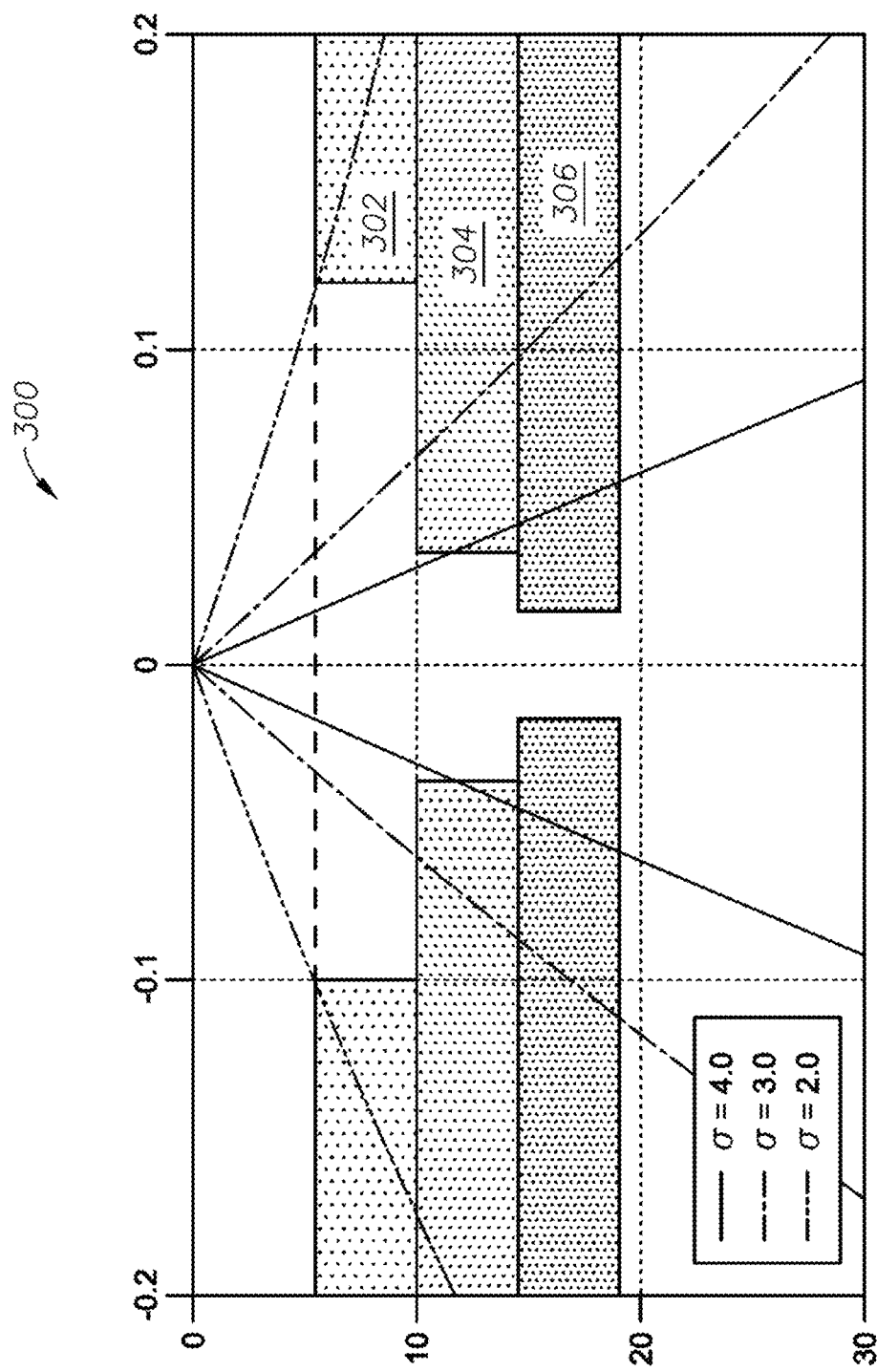
FIG. 3 is a graph illustrating RMO functions with different offset-to-depth ratios for a single horizontal VTI layer, according to certain embodiments of the present disclosure.

For certain embodiments, seismic data can be recorded over a limited range of offsets. FIG. 3 illustrates a graph 300 showing RMO functions having different offset-to-depth ratios σ for a single horizontal VTI layer, according to certain illustrative embodiments of the present disclosure. The graph 300 in FIG. 3 can be employed to examine how the estimated anellipticity parameter η can be accurately resolved with increasing a reflector depth. FIG. 3 redraws FIG. 2 in terms of different offset-to-depth ratios σ (e.g., 2.0, 3.0 and 4.0) with horizontal axis replaced by the anellipticity parameter η. In one or more embodiments, anellipticity resolving power can be defined as a range where the anellipticity parameter η can be accurately resolved as a function of an offset-to-depth ratio α based on the same RMO percentage as in FIG. 2 (e.g., the RMO percentage of 5%). In FIG. 3, a length of box 302 represents the anellipticity resolving power for the offset-to-depth ratio α of 2.0; a length of box 304 represents the anellipticity resolving power for the offset-to-depth ratio α of 3.0; and a length of box 306 represents the anellipticity resolving power for the offset-to-depth ratio α of 4.0. Hence, the anellipticity resolving power increases with increasing of a value of the offset-to-depth ratio σ. FIG. 3 indicates that the accuracy of estimated anellipticity parameter η decreases with increasing of a reflector depth due to the limitation of the offset. For example, if an average offset-to-depth ratio σ of 2.5 is accepted for estimating a value of the anellipticity parameter η, and if the maximum offset in seismic data is 10 km, then the maximum depth for effective estimation from equation (2) can be 4 km and uncertainties are increased beyond this depth.

In accordance with embodiments of the present disclosure, a robust and effective method for estimating effective values of the anellipticity parameter η in offset image gathers is based on computing semblance scans as a function of RMO parameter η. In one or more embodiments, the maxima of the semblance for each depth may be chosen that are associated with estimates of effective values of the anellipticity parameter η. The presented method is stable because semblance analysis is less sensitive to travel-time errors than least-square travel-time fitting. Furthermore, the presented semblance-based estimation method is effective when the RMO function used for computing semblance closely approximates the true move-outs in the offset image gather. In one or more embodiments, equation (2) may be used to compute the semblance S of an offset image gather, as defined by:

$$S(\eta, z_0) = \frac{\int_{z_0-l/2}^{z_0+l/2} \left[\int q(z(\eta, x), x) dx\right]^2 dz}{\int_{z_0-l/2}^{z_0+l/2} \int q^2(z(\eta, x), x) dx dz}, \quad (3)$$

where z is a proposed RMO function defined by equation (2); $z_0$ is a depth of the migrated image point at zero offset; x is an offset between a source and a receiver; q is a trace amplitude in an offset image gather; and l is a window length used to smooth the semblance spectrum estimates. In one or more embodiments, effective values of the anellipticity parameter η for different depths $z_0$ (i.e., field of values) are then obtained from chosen maxima of values of the semblance S defined by equation (3). For certain illustrative embodiments, field of values of the semblance defined by equation (3) may be generated by scanning values of the anellipticity parameter η from, for example, −0.05 to 0.2.

Figure 4:
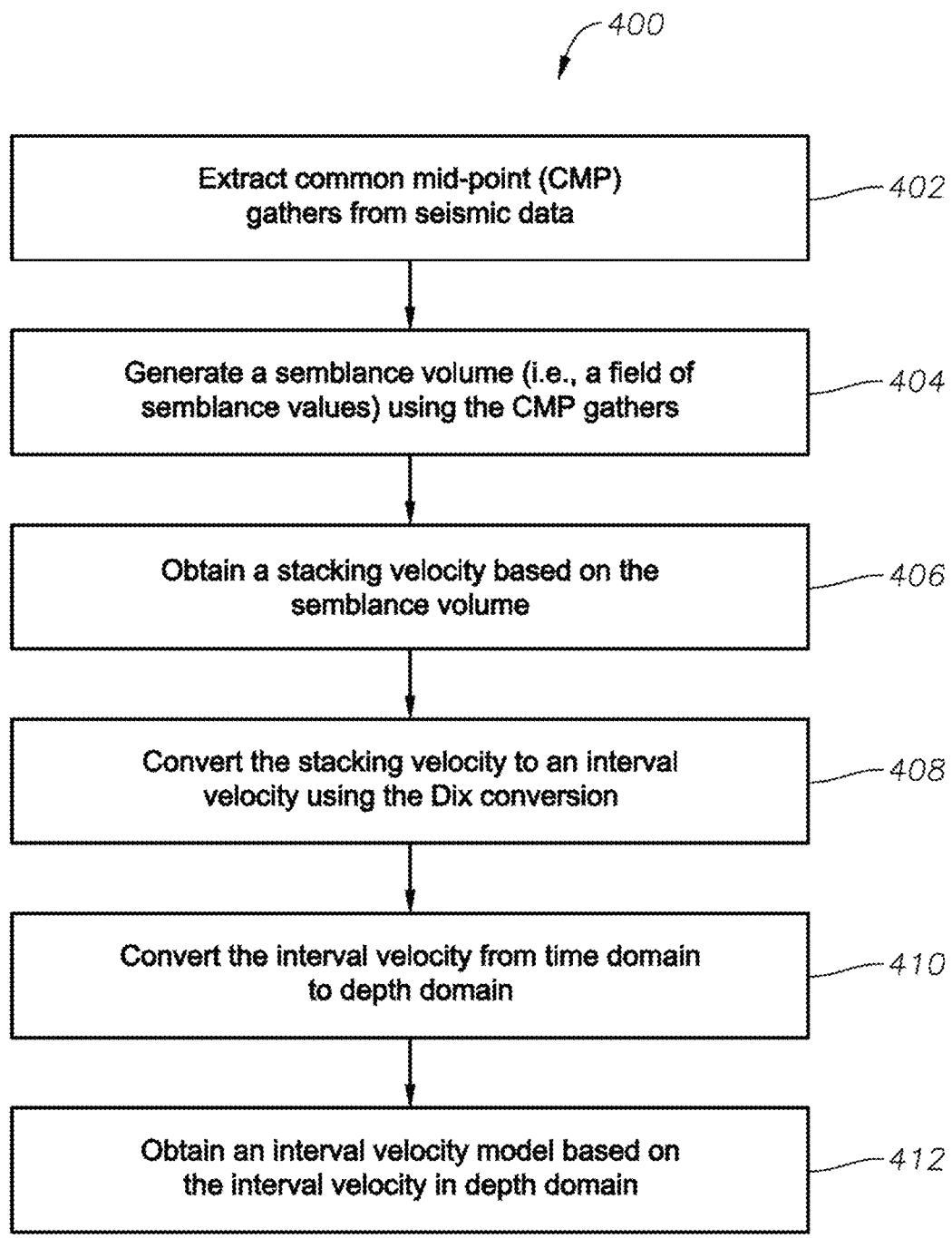
FIG. 4 is a flow chart of a workflow of normal move-out (NMO) velocity analysis for building an initial velocity model for isotropic pre-stack depth migration (PSDM), according to certain embodiments of the present disclosure.

FIG. 4 illustrates a flow chart of a workflow 400 for NMO velocity analysis that may be applied to build an initial velocity model for isotropic PSDM, according to certain illustrative embodiments of the present disclosure. The workflow 400 begins at 402 by extracting common midpoint (CMP) gathers from seismic data. At 404, a semblance volume (i.e., a field of semblance values) may be generated using the CMP gathers of block 402. At 406, a stacking velocity may be obtained based on the semblance volume. At 408, the stacking velocity may be converted to an interval velocity using the Dix conversion. At 410, the interval velocity may be converted from the time domain to the depth domain. At 412, an interval velocity model may be obtained based on the interval velocity in the depth domain.

Figure 5:
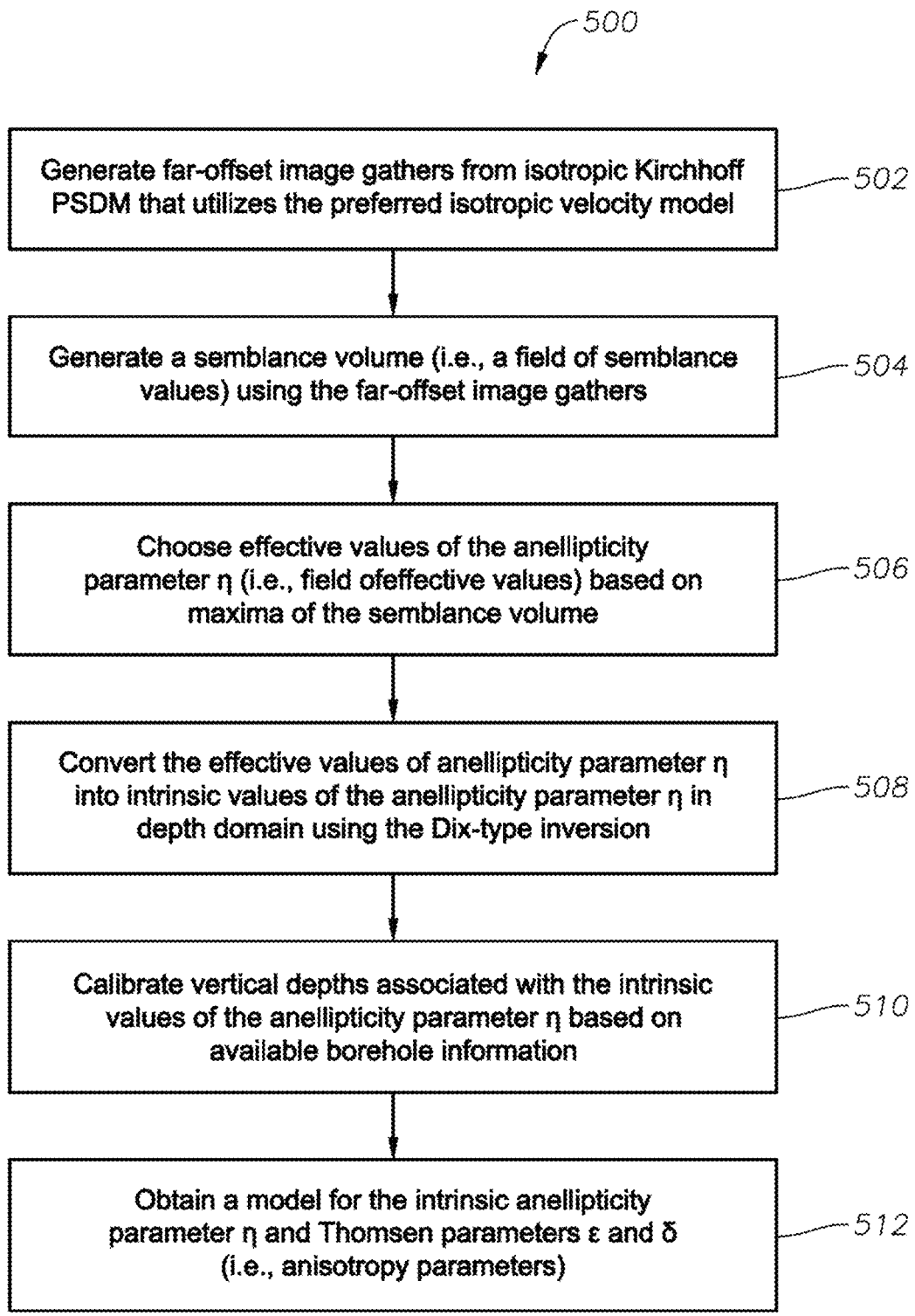
FIG. 5 is a flow chart of a workflow for the semblance-based estimation of anisotropy parameters (e.g., anellipticity parameter $\eta$), according to certain embodiments of the present disclosure.

FIG. 5 illustrates a flow chart of a workflow 500 for the semblance-based estimation of anisotropy parameters (e.g., anellipticity parameter η) and building of an intrinsic anisotropy model, according to certain illustrative embodiments of the present disclosure. In one or more embodiments, the workflow 500 represents a method for estimating an initial field of values of the anellipticity parameter η from P-wave seismic data, and then converting the estimated anellipticity field into a field of values of the Thomsen parameter E using a field of reference values of the Thomsen parameter δ for anisotropic PSDM. The workflow 500 begins at 502 by generating far-offset image gathers from isotropic Kirchhoff PSDM that utilizes the preferred isotropic velocity model. At 504, a semblance volume (i.e., a field of semblance values) may be generated using offset image gathers of block 502. At 506, effective values of the anellipticity parameter η (i.e., field of effective values) may be chosen based on maxima of the semblance volume obtained at block 504. At 508, the effective values of anellipticity parameter η chosen at block 506 may be converted into intrinsic values of the anellipticity parameter η in the depth domain using the Dix-type inversion. At 510, vertical depths associated with the intrinsic values of the anellipticity parameter η may be calibrated based on available wellbore information. At 512, a model for the intrinsic anellipticity parameter η and Thomsen parameters ε and δ (i.e., anisotropy parameters) may be obtained.

In one or more embodiments, the near-offset P-wave data, i.e., data with a maximum offset equals to a reflector depth or a maximum reflection angle closes to 30°, may be used to apply an isotropic TMVA in order to obtain the preferred isotropic velocity that flattens the near-offset image gathers produced by the isotropic Kirchhoff PSDM. Then, the far-offset image gathers may be generated from the isotropic Kirchhoff PSDM using this preferred isotropic velocity model.

For certain embodiments, the semblance analysis presented herein can be used to automatically measure the coherence of depth residuals in an offset image gather. Equations (2) and (3) can be applied for generating the semblance volume at the block 504 in the workflow 500 illustrated in FIG. 5. In one or more embodiments, the effective values of anellipticity parameter η can be picked either from a grid-based semblance volume or from a horizon-based semblance volume in the least squares sense in order to reduce noisy picking.

For certain embodiments, in the presence of area with strong anisotropy variation in depth, the picked field of effective values of the anellipticity parameter η (i.e., the effective values of anellipticity parameter chosen at the block 506 of the workflow 500 illustrated in FIG. 5) should be converted into a field of intrinsic values of the anellipticity parameter η by applying the Dix-type inversion (i.e., performed at the block 508 of the workflow 500 illustrated in FIG. 5) and by depth calibration (i.e., performed at the block 510 of the workflow 500 illustrated in FIG. 5) with the aid of borehole information when available. However, the Dix-type conversion may result in instabilities due to accumulation of errors with increasing depth during the inversion process. In one or more embodiments, the method based on least squares can be applied in order to stabilize the Dix-type conversion. In one or more embodiments, the Thomsen parameter E can thence be converted from the anellipticity parameter η analytically using equation (1) and be constrained by $(1+2\delta)\eta_{min}+\delta \leq \varepsilon \leq (1+2\delta)\eta_{max}+\delta$, provided that the Thomsen parameter δ was predicted from the depth calibration (e.g., the depth mis-tie calibration).

Two illustrative numerical tests are presented herein to demonstrate the potential application of the presented semblance-based method/workflow for anisotropy parameter estimation using the isotropic offset image gathers. All synthetic data sets are generated with a high-order finite-difference method using 20 Hz Ricker wavelet. The migration is conducted by applying the isotropic Kirchhoff PSDM using the preferred isotropic velocity that is inverted by the ray-based isotropic TMVA.

Figure 6:
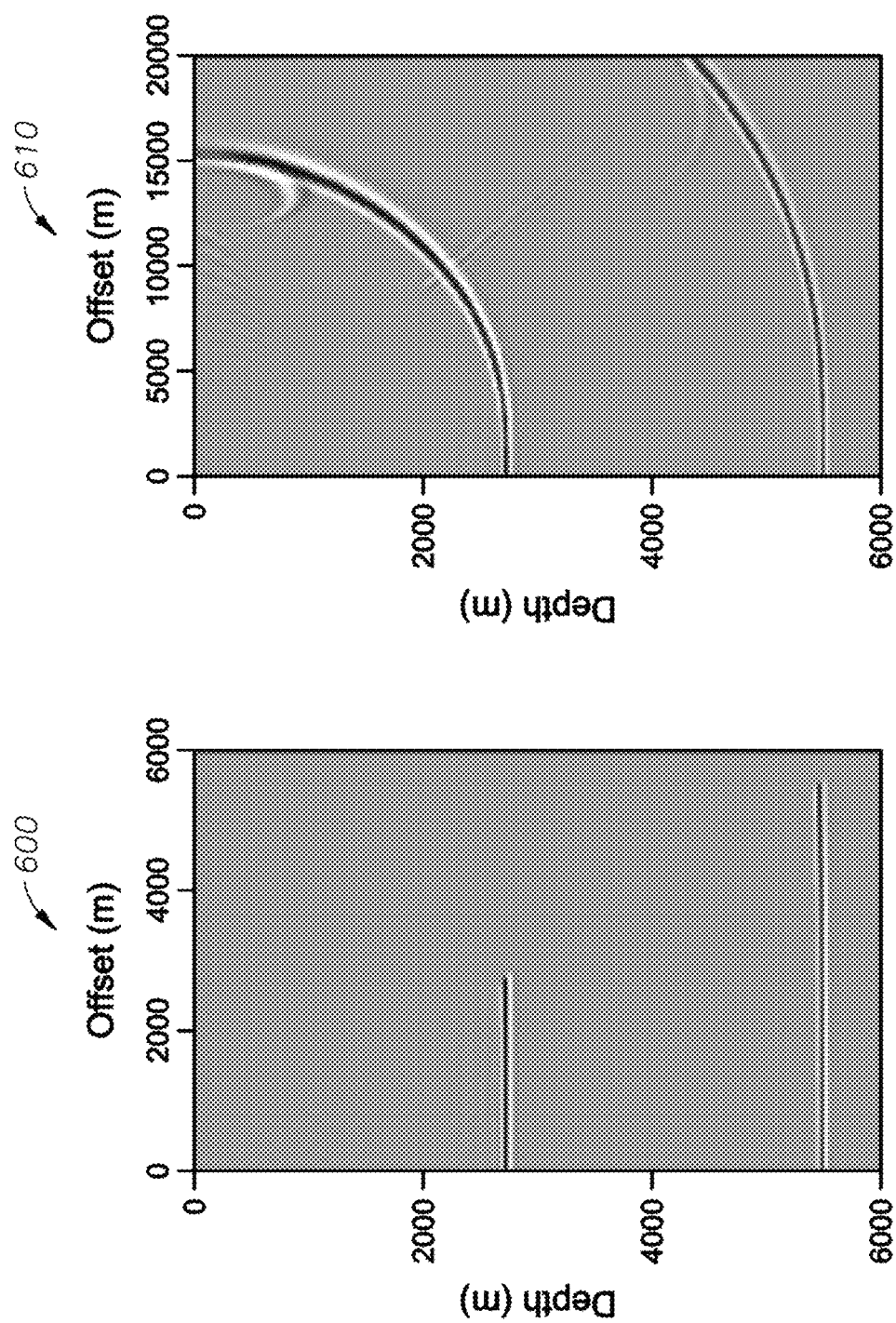
FIG. 6 illustrates graphs of depth residuals in near-offset image gathers and far-offset image gathers, according to certain embodiments of the present disclosure.
Figure 7:
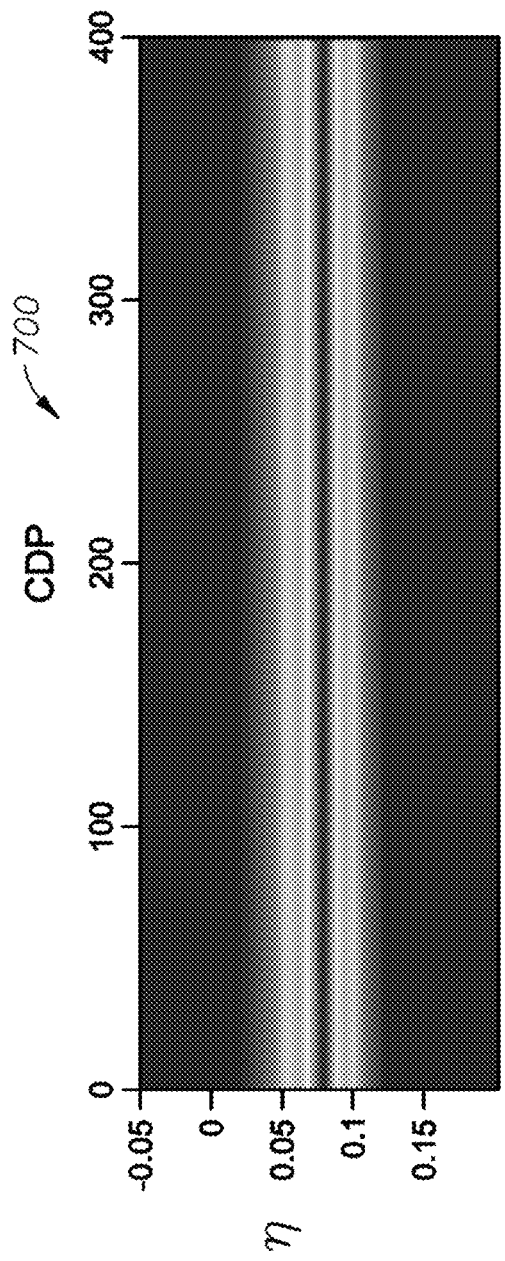
FIG. 7 illustrates graphs of semblance volumes in case of two different horizons (formation layers) for scanned values of the anellipticity parameter $\eta$, according to certain embodiments of the present disclosure.
Figure 7:
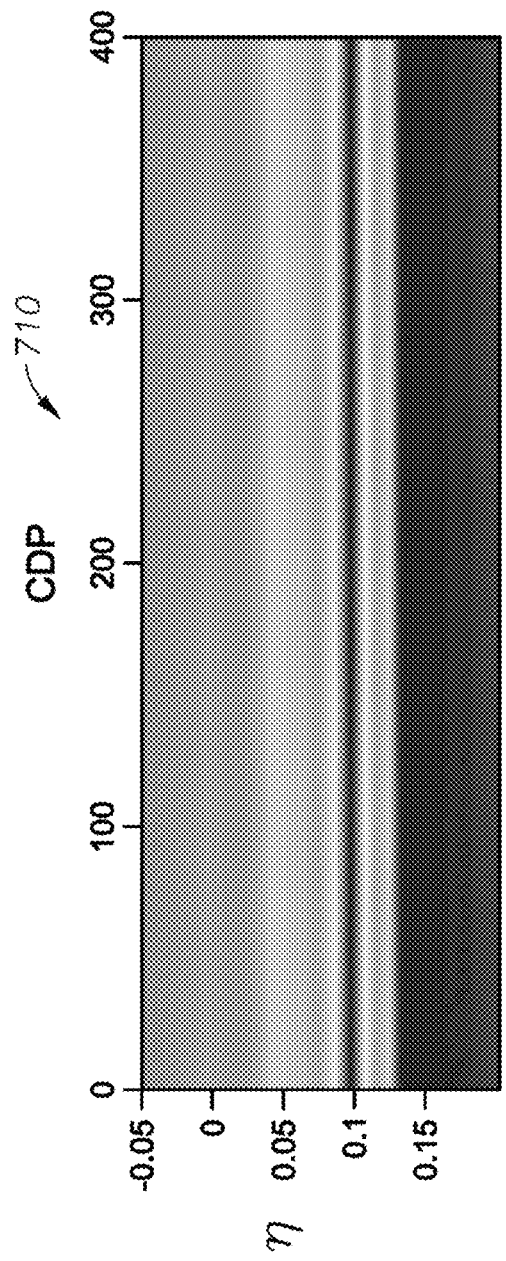

Accuracy of the presented analytical RMO function defined by equation (2) can be tested using a constant VTI model with two horizontal reflectors at depths of 2.5 km and 5.0 km. The background vertical velocity is 3.0 km/s, the first Thomsen parameter ε is 0.2 and the second Thomsen parameter δ is 0.1. The maximum offset for generating the synthetic data is set to 20 km. FIG. 6 illustrates a graph 600 of near-offset image gathers and a graph 610 of far-offset image gathers for two events at horizon depths of 2.5 km and 5.0 km, according to certain illustrative embodiments of the present disclosure. Graph 600 shows that the near-offset image gathers are flattened using the preferred isotropic velocity of 3286 m/s after application of the isotropic TMVA. The far-offset image gathers are generated by using this preferred isotropic velocity. Graph 610 in FIG. 6 shows depth residuals in the far-offset image gathers generated by using the preferred isotropic velocity, according to certain illustrative embodiments of the present disclosure. Graph 610 demonstrates that RMO on far-offset image gathers caused by lack of accurate estimation of anisotropy parameters can be exactly predicted by applying equation (2).

The workflow 500 illustrated in FIG. 5 can be tested on a VTI horizontally layered model. After an isotropic migration using the preferred isotropic velocities, two horizons can be chosen on the near-offset stacked image. Two semblance volumes are generated using the far-offset image gathers with offset-to-depth ratio of σ=3 illustrated in FIG. 7 for horizon depths at 2730 m (semblance volume 700 in FIG. 7) and 5530 m (semblance volume 710 in FIG. 7).

FIG. 8 illustrates in table 800 anisotropy parameters for a true horizontally layered model (e.g., three-layer model), according to certain illustrative embodiments of the present disclosure. Estimated results of anisotropy parameters for top two layers (i.e., layer 1 and layer 2) are shown in Table 810 in FIG. 8. Considering the knowledge of reference values of the Thomsen parameter δ for the model, the resolved anisotropy parameters η and ε shown in table 810 are comparable with those of the true model (i.e., values of anisotropy parameters η and E shown in table 800).

As the conventional isotropic data processing methods introduce errors for the anisotropic case, robust techniques for the estimation of anisotropy parameters based on the error analysis are of crucial importance. It is demonstrated in the present disclosure that it is possible to obtain estimates of the anellipticity parameter η in the depth domain deterministically from the P-wave seismic data alone by using anisotropic data migrated with the preferred isotropic velocity inverted from the isotropic tomography. Similar to the traditional NMO velocity analysis, the semblance scanning procedure and the Dix-type inversion are performed to obtain estimates of the anisotropy parameters.

The semblance-based methods and workflows of the prior art requires that the measured depth residuals are reasonably accurate. Picking such an event is highly dependent on quality of seismic data. The prior art methods were not able to handle a model with strong velocity variation in depth, because at the critical angle, amplitudes change abruptly and phase changes make any parameter extraction difficult. The prior art methods work well only for the shallow part of the model due to the limitation of maximum offset. As discussed in the present disclosure, an offset-depth ratio of at least two is suitable for accurate estimation of the anellipticity parameter η.

Estimation of the anisotropy parameters (e.g., the anellipticity parameter η and the Thomsen parameters ε and δ) by the method presented herein provides seismic data processing with accurate initial parameters for anisotropic depth migrations. The method presented in this disclosure establishes a more rigorous approach than simply guessing starting parameters for anisotropic velocity model building.

Figure 9:
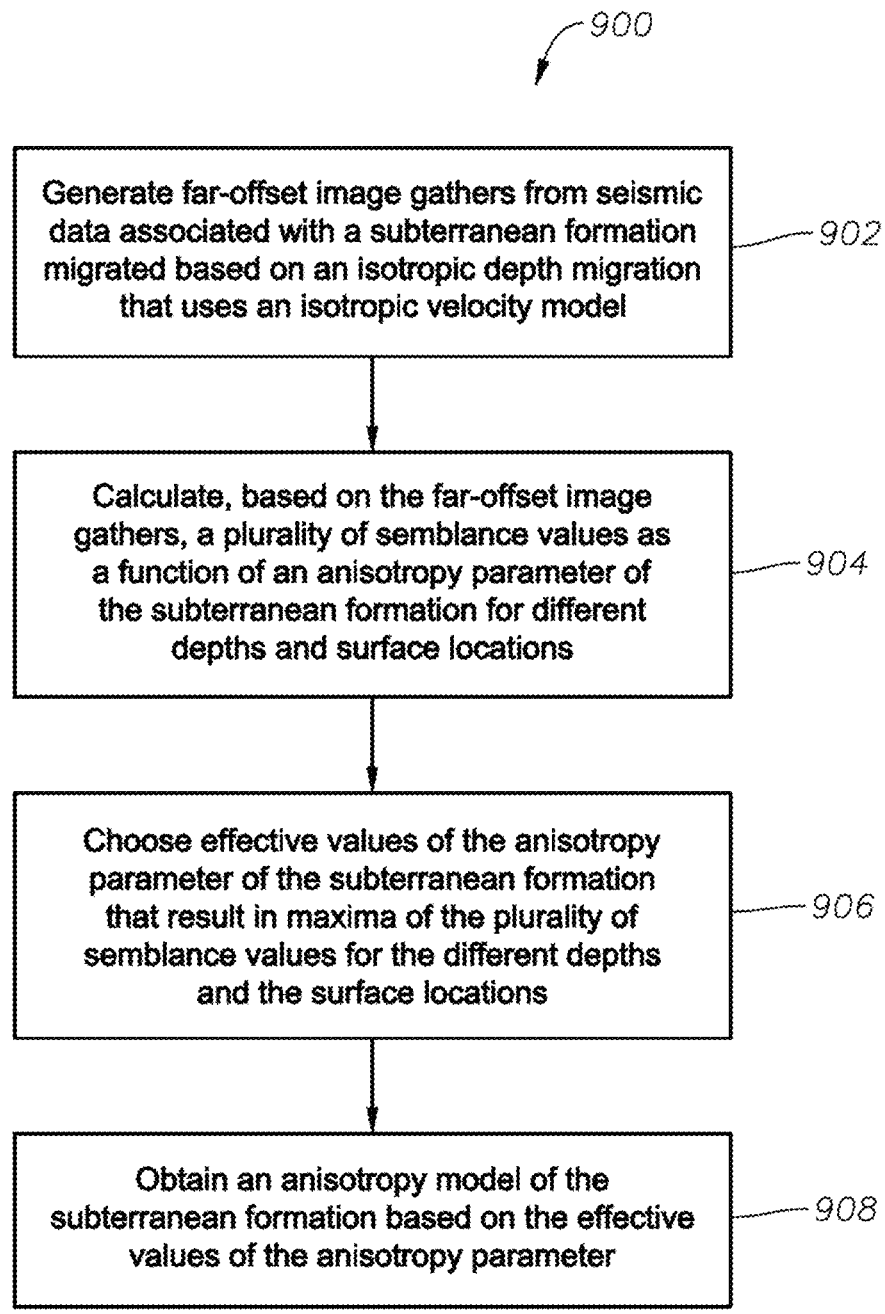
FIG. 9 is a flow chart of a method for semblance-based estimation of anisotropy parameters using isotropic depth-migrated common image gathers, according to certain embodiments of the present disclosure.

Discussion of an illustrative method of the present disclosure will now be made with reference to FIG. 9, which is a flow chart 900 of a method for semblance-based anisotropy parameter estimation using isotropic depth-migrated common image gathers, according to certain illustrative embodiments of the present disclosure. In one or more embodiments, the operations of method 900 of FIG. 9 may be performed by a computing system placed on a location remotely from a well site. In one or more other embodiments, the operations of method 900 of FIG. 9 may be performed by a computing system located on a well site (e.g., computing system 108 illustrated in FIG. 1). The method begins at 902 by generating far-offset image gathers from seismic data associated with a subterranean formation migrated based on an isotropic depth migration (e.g., isotropic Kirchhoff PSDM) that uses an isotropic velocity model (e.g., obtained based upon the isotropic TMVA). At 904, based on the far-offset image gathers, a plurality of semblance values may be calculated (e.g., by applying equation (3)) as a function of an anisotropy parameter of the subterranean formation for different depths and surface locations. At 906, effective values of the anisotropy parameter (e.g., anellipticity parameter η) of the subterranean formation may be chosen that result in maxima of the plurality of semblance values for the different depths and the surface locations. At 908, an anisotropy model of the subterranean formation may be obtained based on the effective values of the anisotropy parameter. For some embodiments, as discussed, the anisotropy model may comprise field of intrinsic values of anellipticity parameter $\eta$ and values of Thomsen anisotropy parameters $\varepsilon$ and $\delta$ for different depths and surface locations.

FIG. 10 is a block diagram of an illustrative computing system 1000 (also illustrated in FIG. 1 as computing system 108) in which embodiments of the present disclosure may be implemented adapted for semblance-based anisotropy parameter estimation using isotropic depth-migrated common image gathers. For example, operations of the workflow 400 of FIG. 4, operations of the workflow 500 of FIG. 5, and operations of the method 900 of FIG. 9, as described above, may be implemented using the computing system 1000. The computing system 1000 can be a computer, phone, personal digital assistant (PDA), or any other type of electronic device. Such an electronic device includes various types of computer readable media and interfaces for various other types of computer readable media. As shown in FIG. 10, the computing system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

The bus 1008 collectively represents all system, peripheral, and chipset buses that communicatively connect the numerous internal devices of the computing system 1000. For instance, the bus 1008 communicatively connects the processing unit(s) 1012 with the ROM 1010, the system memory 1004, and the permanent storage device 1002.

From these various memory units, the processing unit(s) 1012 retrieves instructions to execute and data to process in order to execute the processes of the subject disclosure. The processing unit(s) can be a single processor or a multi-core processor in different implementations.

The ROM 1010 stores static data and instructions that are needed by the processing unit(s) 1012 and other modules of the computing system 1000. The permanent storage device 1002, on the other hand, is a read-and-write memory device. This device is a non-volatile memory unit that stores instructions and data even when the computing system 1000 is off. Some implementations of the subject disclosure use a mass-storage device (such as a magnetic or optical disk and its corresponding disk drive) as the permanent storage device 1002.

Other implementations use a removable storage device (such as a floppy disk, flash drive, and its corresponding disk drive) as the permanent storage device 1002. Like the permanent storage device 1002, the system memory 1004 is a read-and-write memory device. However, unlike the storage device 1002, the system memory 1004 is a volatile read-and-write memory, such a random access memory. The system memory 1004 stores some of the instructions and data that the processor needs at runtime. In some implementations, the processes of the subject disclosure are stored in the system memory 1004, the permanent storage device 1002, and/or the ROM 1010. For example, the various memory units include instructions for computer aided pipe string design based on existing string designs in accordance with some implementations. From these various memory units, the processing unit(s) 1012 retrieves instructions to execute and data to process in order to execute the processes of some implementations.

The bus 1008 also connects to the input and output device interfaces 1014 and 1006. The input device interface 1014 enables the user to communicate information and select commands to the computing system 1000. Input devices used with the input device interface 1014 include, for example, alphanumeric, QWERTY, or T9 keyboards, microphones, and pointing devices (also called "cursor control devices"). The output device interfaces 1006 enables, for example, the display of images generated by the computing system 1000. Output devices used with the output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, the bus 1008 also couples the computing system 1000 to a public or private network (not shown) or combination of networks through a network interface 1016. Such a network may include, for example, a local area network ("LAN"), such as an Intranet, or a wide area network ("WAN"), such as the Internet. Any or all components of the computing system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, operations of the workflow 400 of FIG. 4, operations of the workflow 500 of FIG. 5, and operations of the method 900 of FIG. 9, as described above, may be implemented using the computing system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs implemented on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of exemplary approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the illustrative methods described herein may be implemented by a system including processing circuitry or a computer program product including instructions which, when executed by at least one processor, causes the processor to perform any of the methods described herein.

A computer-implemented method for anisotropy parameter estimation has been described in the present disclosure and may generally include: generating far-offset image gathers from seismic data associated with a subterranean formation migrated based on an isotropic depth migration that uses an isotropic velocity model; calculating, based on the far-offset image gathers, a plurality of semblance values as a function of an anisotropy parameter of the subterranean formation for different depths and surface locations; choosing effective values of the anisotropy parameter of the subterranean formation that result in maxima of the plurality of semblance values for the different depths and the surface locations; and obtaining an anisotropy model of the subterranean formation based on the effective values of the anisotropy parameter.

Further, a computer-readable storage medium having instructions stored therein, which when executed by a computer cause the computer to perform a plurality of functions, including functions to: generate far-offset image gathers from seismic data associated with a subterranean formation migrated based on an isotropic depth migration that uses an isotropic velocity model; calculate, based on the far-offset image gathers, a plurality of semblance values as a function of an anisotropy parameter of the subterranean formation for different depths and surface locations; choose effective values of the anisotropy parameter of the subterranean formation that result in maxima of the plurality of semblance values for the different depths and the surface locations; and obtain an anisotropy model of the subterranean formation based on the effective values of the anisotropy parameter.

For the foregoing embodiments, the method or functions may include any one of the following operations, alone or in combination with each other: Converting the effective values of the anisotropy parameter into intrinsic values of the anisotropy parameter in depth domain; Calibrating vertical depths of the subterranean formation associated with the intrinsic values of the anisotropy parameter based upon information related to a wellbore penetrating the subterranean formation; Obtaining the anisotropy model of the subterranean formation comprises obtaining intrinsic values of the anisotropy parameter for the different depths and the surface locations by converting the effective values of the anisotropy parameter, and determining, for the different depths and the surface locations, values of another anisotropy parameter of the subterranean formation based on the intrinsic values of the anisotropy parameter; Performing, by using the anisotropy model, an anisotropic PSDM on the seismic data associated with the subterranean formation to obtain a seismic volume of the subterranean formation; Performing drilling of a wellbore penetrating the subterranean formation based upon the obtained seismic volume; Performing an anisotropic TMVA of the subterranean formation by using the anisotropy model.

The isotropic depth migration comprises the isotropic Kirchhoff PSDM; The isotropic velocity model comprises one or more velocities obtained based upon an isotropic TMVA; The anisotropy parameter comprises an anellipticity parameter of the subterranean formation; The conversion of the effective values of the anisotropy parameter into the intrinsic values of the anisotropy parameter is based on the Dix-type conversion; The intrinsic values of the anisotropy parameter comprise intrinsic values of an anellipticity parameter of the subterranean formation; The values of the other anisotropy parameter comprise values of a first Thomsen anisotropy parameter of the subterranean formation; The anisotropy model further comprises values of a second Thomsen anisotropy parameter of the subterranean formation predicted from a depth calibration.

Likewise, a system for anisotropy parameter estimation has been described and include at least one processor and a memory coupled to the processor having instructions stored therein, which when executed by the processor, cause the processor to perform functions, including functions to: generate far-offset image gathers from seismic data associated with a subterranean formation migrated based on an isotropic depth migration that uses an isotropic velocity model; calculate, based on the far-offset image gathers, a plurality of semblance values as a function of an anisotropy parameter of the subterranean formation for different depths and surface locations; choose effective values of the anisotropy parameter of the subterranean formation that result in maxima of the plurality of semblance values for the different depths and the surface locations; and obtain an anisotropy model of the subterranean formation based on the effective values of the anisotropy parameter.

For any of the foregoing embodiments, the system may include any one of the following elements, alone or in combination with each other: the functions performed by the processor include functions to convert the effective values of the anisotropy parameter into intrinsic values of the anisotropy parameter in depth domain, and calibrate vertical depths of the subterranean formation associated with the intrinsic values of the anisotropy parameter based upon information related to a wellbore penetrating the subterranean formation; the functions performed by the processor for obtaining the anisotropy model of the subterranean formation include functions to obtain intrinsic values of the anisotropy parameter for the different depths and the surface locations by converting the effective values of the anisotropy parameter, and determine, for the different depths and the surface locations, values of another anisotropy parameter of the subterranean formation based on the intrinsic values of the anisotropy parameter; the functions performed by the processor include functions to perform, by using the anisotropy model, an anisotropic PSDM on the seismic data associated with the subterranean formation to obtain a seismic volume of the subterranean formation; the functions performed by the processor include functions to perform drilling of a wellbore penetrating the subterranean formation based upon the obtained seismic volume; the functions performed by the processor include functions to perform an anisotropic TMVA of the subterranean formation by using the anisotropy model.

A method for estimating anisotropy parameters (e.g., anellipticity parameter $\eta$ and Thomsen parameters $\varepsilon$ and $\delta$) in the depth domain is presented in this disclosure, which represents an integral part of a seismic data processing workflow with preferred values of initial parameters for anisotropic depth migration. Embodiments of the present disclosure establish a more rigorous approach for anisotropy parameter estimation in comparison with a method based on simple guessing of starting parameters for anisotropic velocity model building. Embodiments of the present disclosure provide a robust and effective semblance-based approach for obtaining the estimates of anellipticity parameter $\eta$ in the depth domain deterministically from the P-wave seismic data alone by using anisotropic data migrated with a preferred isotropic velocity inverted from an isotropic migration velocity analysis. The RMO function is derived in the present disclosure without weak anisotropy assumption. Furthermore, the RMO function derived herein closely approximates the true move-outs in the isotropic depth-migrated offset image gathers.

A workflow for building the anisotropy model for anisotropic PSDM is presented in this disclosure, which maintains the simplicity of the traditional NMO velocity analysis workflow for building velocity model for isotropic PSDM. The workflow presented herein builds the initial anisotropy model in the same way as the isotropy model is built for the isotropic data processing, which does not require a prior constraint such as prior knowledge of a vertical velocity. The automated workflow of the present disclosure can significantly shorten the anisotropic MVA processing cycle.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

While specific details about the above embodiments have been described, the above hardware and software descriptions are intended merely as example embodiments and are not intended to limit the structure or implementation of the disclosed embodiments. For instance, although many other internal components of computer system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the Figures illustrate the architecture, functionality, and operation of possible implementations of systems, methods and computer program products according to various embodiments of the present disclosure. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

What is claimed is:

1. A computer-implemented method for anisotropy parameter estimation, the method comprising:
   generating far-offset image gathers from p-wave seismic data associated with a subterranean formation migrated based on an isotropic depth migration that uses an isotropic velocity model;
   calculating, based on the far-offset image gathers, a plurality of semblance values as a function of an anisotropy parameter of the subterranean formation for different depths and surface locations;
   choosing effective values of the anisotropy parameter of the subterranean formation that result in maxima of the plurality of semblance values for the different depths and the surface locations; and
   obtaining an anisotropy model of the subterranean formation based on the effective values of the anisotropy parameter.

2. The method of claim 1, wherein:
   the isotropic depth migration comprises the isotropic Kirchhoff pre-stack depth migration (PSDM);
   the isotropic velocity model comprises one or more velocities obtained based upon an isotropic tomographic migration velocity analysis (TMVA); or
   the anisotropy parameter comprises an anellipticity parameter of the subterranean formation.

3. The method of claim 1, further comprising:
   converting the effective values of the anisotropy parameter into intrinsic values of the anisotropy parameter in depth domain; and
   calibrating vertical depths of the subterranean formation associated with the intrinsic values of the anisotropy parameter based upon information related to a wellbore penetrating the subterranean formation.

4. The method of claim 3, wherein the conversion of the effective values of the anisotropy parameter into the intrinsic values of the anisotropy parameter is based on the Dix-type conversion.

5. The method of claim 1, wherein obtaining the anisotropy model of the subterranean formation comprises:
   Obtaining intrinsic values of the anisotropy parameter for the different depths and the surface locations by converting the effective values of the anisotropy parameter; and
   determining, for the different depths and the surface locations, values of another anisotropy parameter of the subterranean formation based on the intrinsic values of the anisotropy parameter.

6. The method of claim 5, wherein:
   the intrinsic values of the anisotropy parameter comprise intrinsic values of an anellipticity parameter of the subterranean formation;
   the values of the other anisotropy parameter comprise values of a first Thomsen anisotropy parameter of the subterranean formation; and
   the anisotropy model further comprises values of a second Thomsen anisotropy parameter of the subterranean formation predicted from a depth calibration.

7. The method of claim 1, further comprising:
   performing, by using the anisotropy model, an anisotropic pre-stack depth migration (PSDM) on the seismic data associated with the subterranean formation to obtain a seismic volume of the subterranean formation.

8. The method of claim 7, further comprising:
   performing drilling of a wellbore penetrating the subterranean formation based upon the obtained seismic volume.

9. The method of claim 1, further comprising:
   performing an anisotropic tomographic migration velocity analysis (TMVA) of the subterranean formation by using the anisotropy model.

10. A system for anisotropy parameter estimation, the system comprising:
    at least one processor; and
    a memory coupled to the processor having instructions stored therein, which when executed by the processor, cause the processor to perform functions, including functions to:
    generate far-offset image gathers from p-wave seismic data associated with a subterranean formation migrated based on an isotropic depth migration that uses an isotropic velocity model;
    calculate, based on the far-offset image gathers, a plurality of semblance values as a function of an anisotropy parameter of the subterranean formation for different depths and surface locations;
    choose effective values of the anisotropy parameter of the subterranean formation that result in maxima of the plurality of semblance values for the different depths and the surface locations; and
    obtain an anisotropy model of the subterranean formation based on the effective values of the anisotropy parameter.

11. The system of claim 10, wherein:
    the isotropic depth migration comprises the isotropic Kirchhoff pre-stack depth migration (PSDM);
    the isotropic velocity model comprises one or more velocities obtained based upon an isotropic tomographic migration velocity analysis (TMVA); or
    the anisotropy parameter comprises an anellipticity parameter of the subterranean formation.

12. The system of claim 10, wherein the functions performed by the processor include functions to:
    convert the effective values of the anisotropy parameter into intrinsic values of the anisotropy parameter in depth domain; and
    calibrate vertical depths of the subterranean formation associated with the intrinsic values of the anisotropy parameter based upon information related to a wellbore penetrating the subterranean formation.

13. The system of claim 12, wherein the conversion of the effective values of the anisotropy parameter into the intrinsic values of the anisotropy parameter is based on the Dix-type conversion.

14. The system of claim 10, wherein the functions performed by the processor for obtaining the anisotropy model of the subterranean formation include functions to:
    obtain intrinsic values of the anisotropy parameter for the different depths and the surface locations by converting the effective values of the anisotropy parameter; and
    determine, for the different depths and the surface locations, values of another anisotropy parameter of the subterranean formation based on the intrinsic values of the anisotropy parameter.

15. The system of claim 14, wherein:
    the intrinsic values of the anisotropy parameter comprise intrinsic values of an anellipticity parameter of the subterranean formation;
    the values of the other anisotropy parameter comprise values of a first Thomsen anisotropy parameter of the subterranean formation; and
    the anisotropy model further comprises values of a second Thomsen anisotropy parameter of the subterranean formation predicted from a depth calibration.

16. The system of claim 10, wherein the functions performed by the processor include functions to:
perform, by using the anisotropy model, an anisotropic pre-stack depth migration (PSDM) on the seismic data associated with the subterranean formation to obtain a seismic volume of the subterranean formation.

17. The system of claim 16, wherein the functions performed by the processor include functions to:
perform drilling of a wellbore penetrating the subterranean formation based upon the obtained seismic volume.

18. The system of claim 10, wherein the functions performed by the processor include functions to:
perform an anisotropic tomographic migration velocity analysis (TMVA) of the subterranean formation by using the anisotropy model.

19. A non-transitory computer-readable storage medium having instructions stored therein, which when executed by a computer cause the computer to perform a plurality of functions, including functions to:
generate far-offset image gathers from p-wave seismic data associated with a subterranean formation migrated based on an isotropic depth migration that uses an isotropic velocity model;
calculate, based on the far-offset image gathers, a plurality of semblance values as a function of an anisotropy parameter of the subterranean formation for different depths and surface locations;
choose effective values of an anisotropy parameter of the subterranean formation that result in maxima of the plurality of semblance values for the different depths and the surface locations; and
obtain an anisotropy model of the subterranean formation based on the effective values of the anisotropy parameter.

20. The computer-readable storage medium of claim 19, wherein the instructions further perform functions to:
obtain intrinsic values of the anisotropy parameter for the different depths and the surface locations by converting the effective values of the anisotropy parameter; and
determine, for the different depths and the surface locations, values of another anisotropy parameter of the subterranean formation based on the intrinsic values of the anisotropy parameter.

* * * * *